US007679629B2

(12) United States Patent
Neuman et al.

(10) Patent No.: US 7,679,629 B2
(45) Date of Patent: Mar. 16, 2010

(54) METHODS AND SYSTEMS FOR CONSTRAINING A VIDEO SIGNAL

(75) Inventors: Darren Neuman, Palo Alto, CA (US); Patrick Law, Milpitas, CA (US); Alek Movshovich, Santa Clara, CA (US); Chuck Monahan, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1320 days.

(21) Appl. No.: 10/641,031

(22) Filed: Aug. 15, 2003
(Under 37 CFR 1.47)

(65) Prior Publication Data
US 2005/0039204 A1    Feb. 17, 2005

(51) Int. Cl.
*G09G 5/02* (2006.01)
*H04N 7/167* (2006.01)
*H04N 11/00* (2006.01)
*H04N 7/12* (2006.01)

(52) U.S. Cl. .................... 345/698; 725/31; 380/203; 348/426.1; 386/37

(58) Field of Classification Search ............... 725/31; 345/398; 348/426.1; 380/203; 386/37
See application file for complete search history.

(56) References Cited

U.S. PATENT DOCUMENTS

| 5,805,222 | A * | 9/1998 | Nakagawa et al. | 375/240.12 |
| 5,896,454 | A * | 4/1999 | Cookson et al. | 360/60 |
| 6,078,617 | A * | 6/2000 | Nakagawa et al. | 375/240 |
| 6,189,064 | B1 * | 2/2001 | MacInnis et al. | 710/244 |
| 6,570,990 | B1 * | 5/2003 | Kohn et al. | 380/213 |
| 6,826,352 | B1 * | 11/2004 | Quan | 386/94 |
| 7,057,627 | B2 * | 6/2006 | MacInnis et al. | 345/636 |
| 2003/0086695 | A1 * | 5/2003 | Okamoto et al. | 386/94 |

FOREIGN PATENT DOCUMENTS

| JP | 06-324669 | * | 11/1994 |
| KR | 10-2000-0060826 | * | 3/1999 |
| KR | 10-2001-0033892 | * | 4/2001 |
| WO | WO-03/061216 A1 | * | 7/2003 |

* cited by examiner

*Primary Examiner*—Hoang-Vu A Nguyen-Ba
(74) *Attorney, Agent, or Firm*—Sterne, Kessler, Goldstein & Fox P.L.L.C.

(57) ABSTRACT

Systems and methods for filtering to comply with copy-protection regulations set forth for HDTV signals by the Motion Picture Association of America ("MPAA") are presented. A copy-protection filter constrains the resolution of the HDTV signal when copy-protection bits are present in a video signal. The copy-protection filter may be placed in an analog data stream before the video signal is converted from a digital to an analog signal. A second copy-protection filter is optionally placed in a digital data stream. The copy-protection filter may be combined with other filters in a video encoder, or with a scaler before the input video data stream enters a compositor.

25 Claims, 8 Drawing Sheets

METHODS AND SYSTEMS FOR CONSTRAINING A VIDEO SIGNAL

BACKGROUND OF THE INVENTION

1. Field of the Invention

This invention relates to filtering of video signals, and more particularly to filtering performed in a set top box or digital television decoder box.

2. Related Art

The basic concept behind high-definition television ("HDTV") is to increase the visual field contained by the image, that is, the resolution. An average cable television signal is transmitted at a resolution of approximately 640×480. In this lexicon, 640 corresponds to the number of active lines per picture, and 480 corresponds to the number of pixels per line. HDTV can include resolutions up to 1920×1080.

In response to this increase in available resolution, a set of standards was released by the Motion Picture Association of America ("MPAA") to regulate proprietary HDTV transmissions. These regulations were meant to protect proprietary transmissions from being copied by users. The protected transmissions are marked with copy-protection bits that may be recognized by a receiver. What are needed, therefore, are methods and systems for implementing the MPAA standards.

SUMMARY OF THE INVENTION

The present invention is directed to systems and methods for reducing a resolution of a digital video signal to comply with the MPAA copy-protection standards. The system comprises a compositor for mixing a video data stream and a graphics data stream to produce a video signal, a video encoder coupled to the compositor, and a copy-protection filter to constrain the resolution of the video signal when copy-protection bits are present in the video signal.

In an embodiment, the copy-protection filter is a low-pass horizontal filter. In another embodiment, the copy-protection filter is a low-pass vertical filter. In yet another embodiment, a combination horizontal and vertical filter are used. For each filter, any number of taps may be used.

The copy-protection filter may be placed in an analog data path in the video encoder before the signal is converted to an analog signal. In another embodiment, a digital data path is coupled to the analog data path. The copy-protection filter may be placed on the analog data path after the connection between the analog and digital data paths. In yet another embodiment, a second copy-protection filter may be placed in the digital data path. The second copy-protection filter may be operated independently of the first copy-protection filter.

In a further embodiment, the copy-protection filter may be combined with other filters in the system. In still another embodiment, the copy-protection filter may be combined with a video scaler before the initial video data stream enters the compositor.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

An HDTV signal may have one of two different resolutions. These resolutions, also referred to as frame formats, are 1920×1080 and 1280×720. The purpose of the present invention is to filter a video signal down to the visual equivalent of 520,000 pixels per frame, or a frame format of 960×540. This means that the 1920×1080 signal is to be filtered to ¼ resolution, and the 1280×720 is to be filtered to ½ resolution. However, it is desired only to filter those signals that contain copy-protection bits in the video signal.

Figure 1:
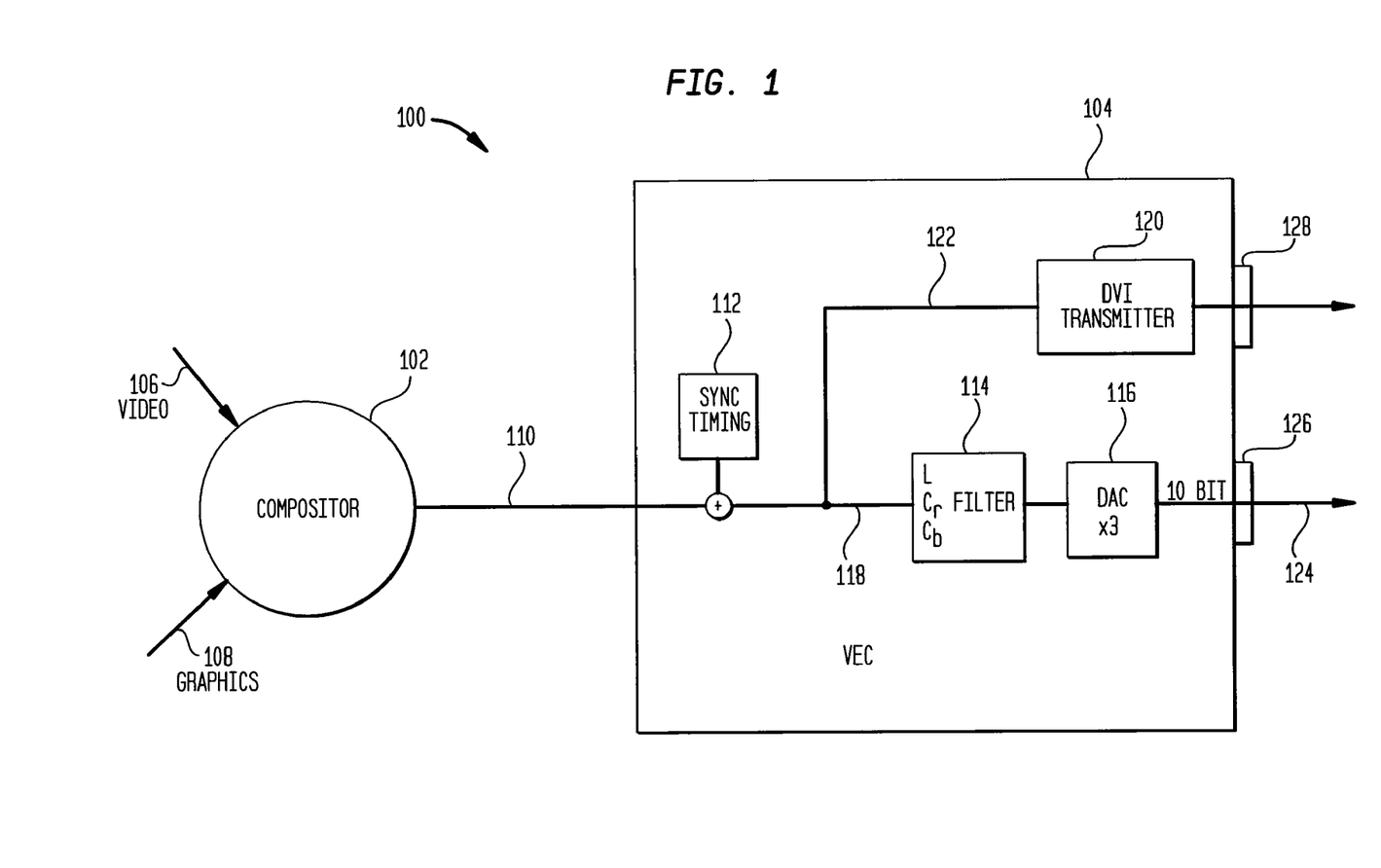
FIG. 1 is a block diagram representing a portion of a video system.

FIG. 1 is a block diagram of a system 100 included in, for example, a set-top box or a TV-on-a-chip system. System 100 includes a compositor 102 and a video encoder ("VEC") 104. Compositor 102 accepts an input video signal 106 and an input graphics signal 108. Compositor outputs composite video signal 110.

VEC 104 includes a sync timing circuit 112, a bandpass filter 114, and a digital-to-analog converter ("DAC") 116, along a first data path 118. In one embodiment, VEC 104 also includes a digital visual interface ("DVI") transmitter 120 on a second data path 122.

Sync timing circuit 112 inserts a sync timing signal into the composite video signal 110. The sync timing signal may include both horizontal and vertical sync, and is used to determine the correct position of an image produced from the composite video signal 110 on a display device.

Bandpass filter 114 limits the bandwidth of the luminance and/or chrominance of composite video signal 110. The bandwidth is limited to comply with additional standards for analog HDTV required by the Society of Motion Pictures and Television Engineers (SMPTE). This requirement limits the bandwidth of the chrominance signals so that a television does not ring when a sharp chrominance edge is input. This requirement is unrelated to the copy-protection requirements promulgated by the MPAA.

In one embodiment, bandpass filter 114 is controlled in such a way that it does not limit the bandwidth when a sync timing signal is inserted into video signal 110. The sync timing signal inserted into the video signal 110 should not be filtered. Otherwise, the timing signal would line up the pixels incorrectly. For this reason, in an embodiment, when processing a part of the signal with an inserted sync timing signal, the bandpass filter 114 is disabled to allow the full bandwidth to pass through. Then, during the active video portion of the video signal, where no timing signals have been inserted, the bandpass filter 114 is enabled to provide the final resolution.

After the bandpass filter 114, composite video signal 110 proceeds along first data path 118 to DAC 116. In an embodiment, DAC 116 is a triple DAC, including three individual 10-bit DACs. DAC 116 converts the composite video signal 110 to analog format to create an analog video signal 124. Analog video signal 124 is output through analog output 126.

DVI transmitter 120, when implemented, transmits video signal 110 in a digital format through digital output 128.

In order for the video system to produce MPAA-compliant signals, a copy-protection filter is inserted into one or more of the video signal data paths 106, 110, 118, and 122. In one embodiment, the copy-protection filter is responsive to copy-protection bits inserted into the input video signal by the distributor. In another embodiment, a control system responsive to copy-protection bits turns the filter on and off as needed.

A variety of one or more types of low-pass filters may be used in the copy-protection filter. For example, a finite impulse response ("FIR") filter may be implemented. Alternatively, or additionally, an infinite impulse response ("IIR") filter is used. One of skill in the art will recognize that other alternative filters may also be used.

Figure 2:
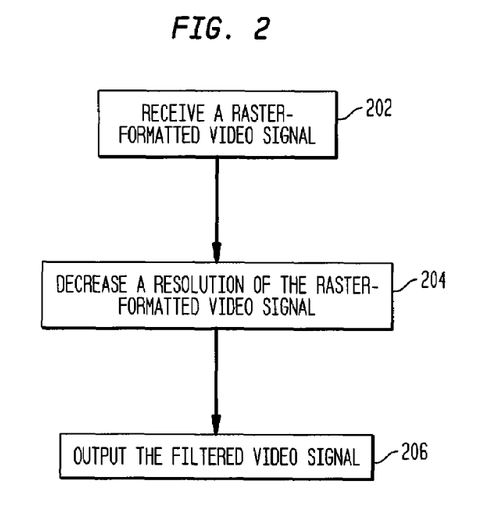
FIG. 2 is a flowchart of an example method of constraining a resolution of a digital video signal.

FIG. 2 is a flowchart of an example method 200 of constraining a resolution of a digital video signal. In step 202, a raster-formatted video signal is received by a low-pass filter having some cutoff frequency. The low-pass filter may be any of the filters discussed above. In the example of FIG. 1, the video signal is one or more of video signals 106, 110, 118, and 122. Method 200 then proceeds to step 204.

In step 204, a set of pixels is filtered from the raster-formatted video signal. In one embodiment, the low-pass filter is a horizontal filter, meaning that it extracts points horizontally across a scan line via a series of taps. In another embodiment, the low-pass filter is a vertical filter, meaning that it extracts points from successive scan lines instead of the same scan line. In yet another embodiment, a combination vertical and horizontal filter may be used. In each embodiment, a tap from the filter extracts one pixel from the video signal. In one embodiment, the filter includes a sync function.

Figure 3:
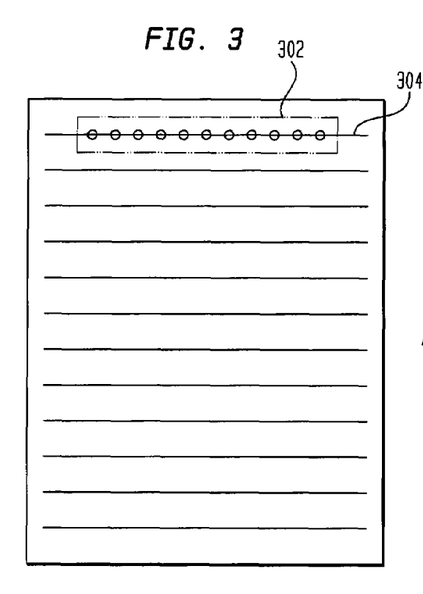
FIG. 3 illustrates tapping of a video scan line using a horizontal filter.

FIG. 3 illustrates how a video scan line is tapped using a horizontal filter. In an embodiment, 11 taps are used. One of skill in the art will recognize that any number of taps may be used depending on the level of signal quality desired. In this embodiment, during step 204, an 11-tap horizontal filter extracts a set of pixels 302, here including 11 adjacent pixels, from a scan line 304 of a video signal.

Figure 4:
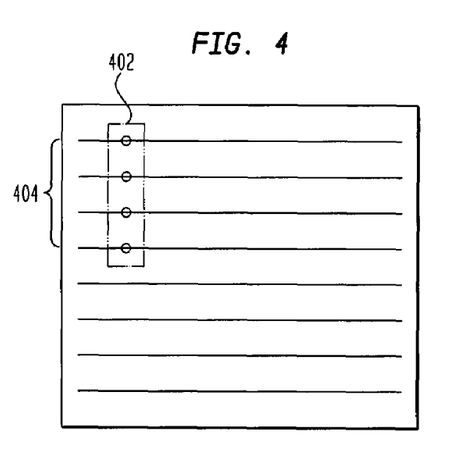
FIG. 4 illustrates tapping of a video scan line using a vertical filter.

FIG. 4 illustrates how a scan line is tapped using a vertical filter. In one embodiment, a 4-tap vertical filter is used, although one of skill in the art will recognize that any number of taps may be implemented. In this embodiment, during step 204, the filter extracts a set of pixels 402, here including 4 pixels, from a set of successive scan lines 404. Each pixel in the set of pixels 402 occupies the same relative position on its respective scan line with respect to all other pixels in the set of pixels 402. This conformity gives the filter its vertical nature.

Returning to FIG. 2, method 200 then proceeds to step 206. In step 206, a filtered video signal is output.

Figure 5:
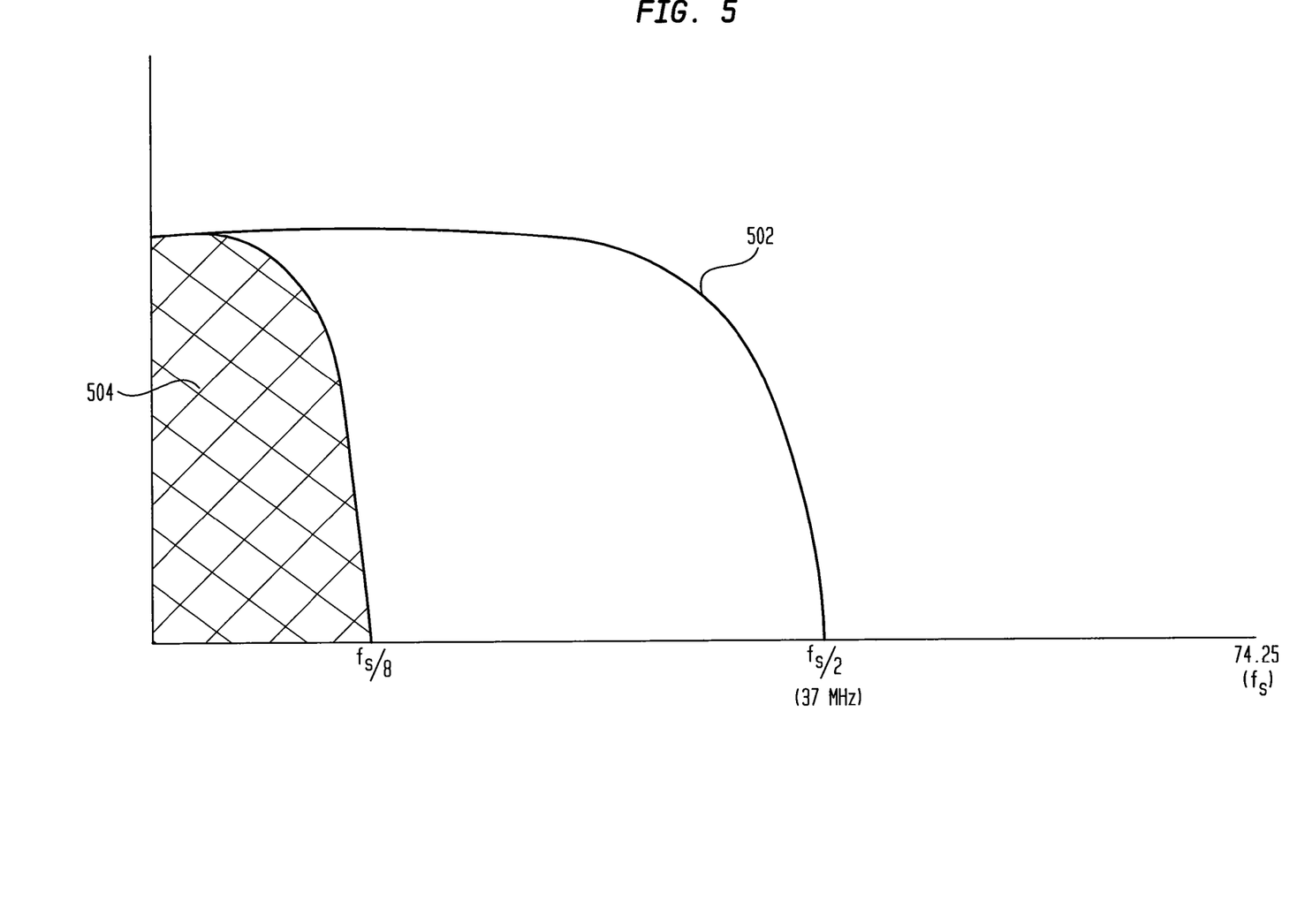
FIG. 5 is a frequency domain illustration of the present invention.

FIG. 5 shows the effect that a filter of the present invention has on an example received signal 502. When signal 502 is a 1920×1080 signal, with a sample rate $F_s$ equal to 74.25 MHz, and a passband $F_s/2$ equal to 37 MHz, signal 502 is filtered down to approximately $F_s/8$. This is approximately ¼ of the passband signal (shaded area 504). When the received signal 502 is a 1280×720 signal, signal 502 is filtered down to approximately $F_s/4$. This is approximately ½ of the passband signal.

Figure 6:
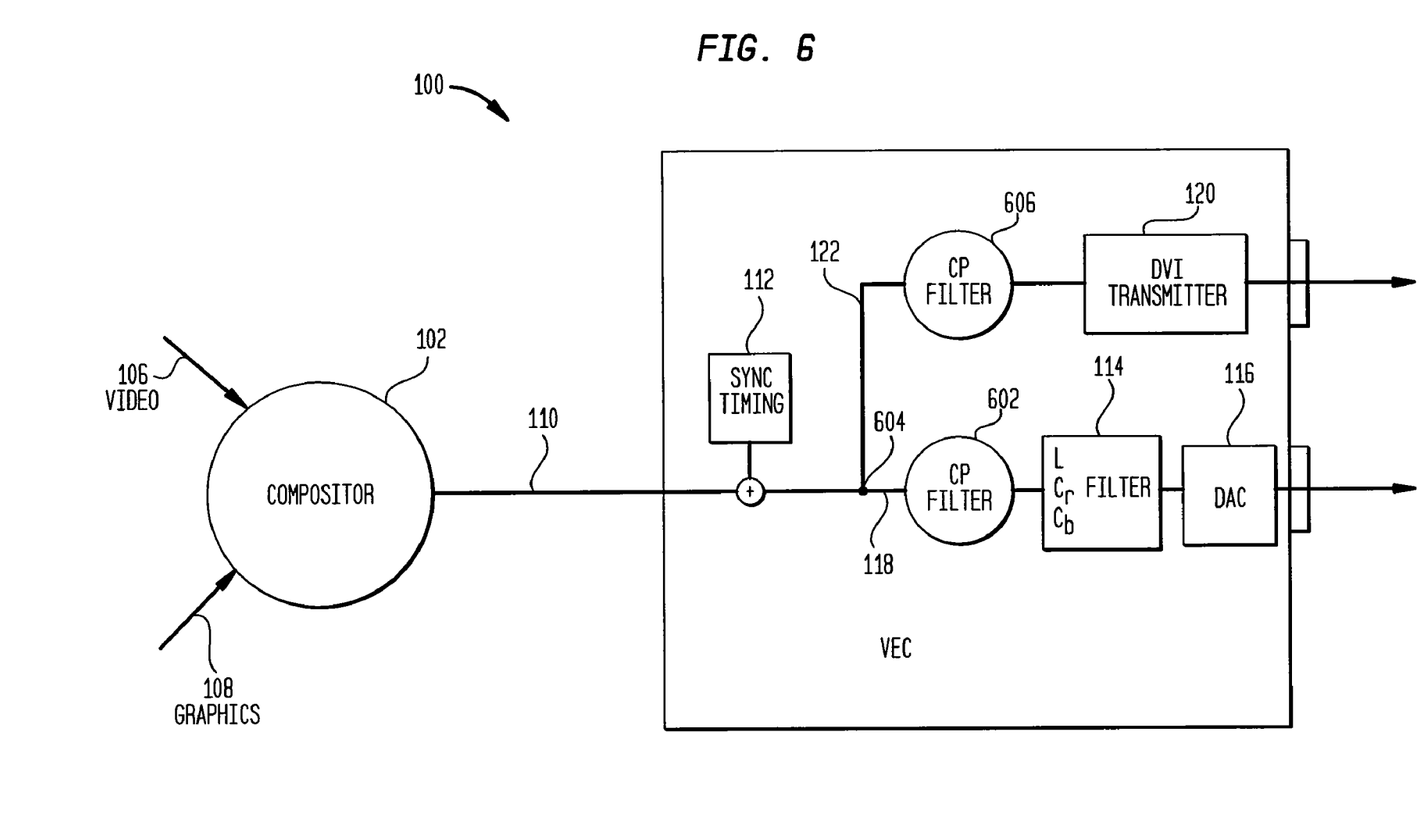
FIG. 6 is a block diagram of an embodiment of the present invention implementing a copy-protection filter.

FIG. 6 is a block diagram of the system 100, including a copy-protection filter 602. Copy protection filter 602 is of the type(s) described in the discussion of FIGS. 2-5, with a cut-off frequency of, for example, $F_s/8$ or $F_s/4$. Copy-protection filter 602 can be placed anywhere along data path 118 before DAC 116. In one embodiment, copy-protection filter 602 is placed in data path 118 between sync timing circuit 112 and bandpass filter 114.

In the example of FIG. 6, copy-protection filter 602 is placed after a connection 604. In this manner, video signals sent to an analog output would be filtered, while video signals sent to a digital output would retain their high resolution characteristics.

Alternatively, a second copy-protection filter 606 is optionally placed in second data path 122 between connection 604 and DVI transmitter 120. A benefit of this embodiment is that the signal in the analog path may be filtered to limit resolution independently of the signal on the digital path. For example, the analog output signal may be filtered, while the digital signal retains its resolution. Alternatively, the digital signal may be filtered, while the resolution of the analog signal remains unfiltered. Each filter may also be active at the same time as the other.

Figure 7:
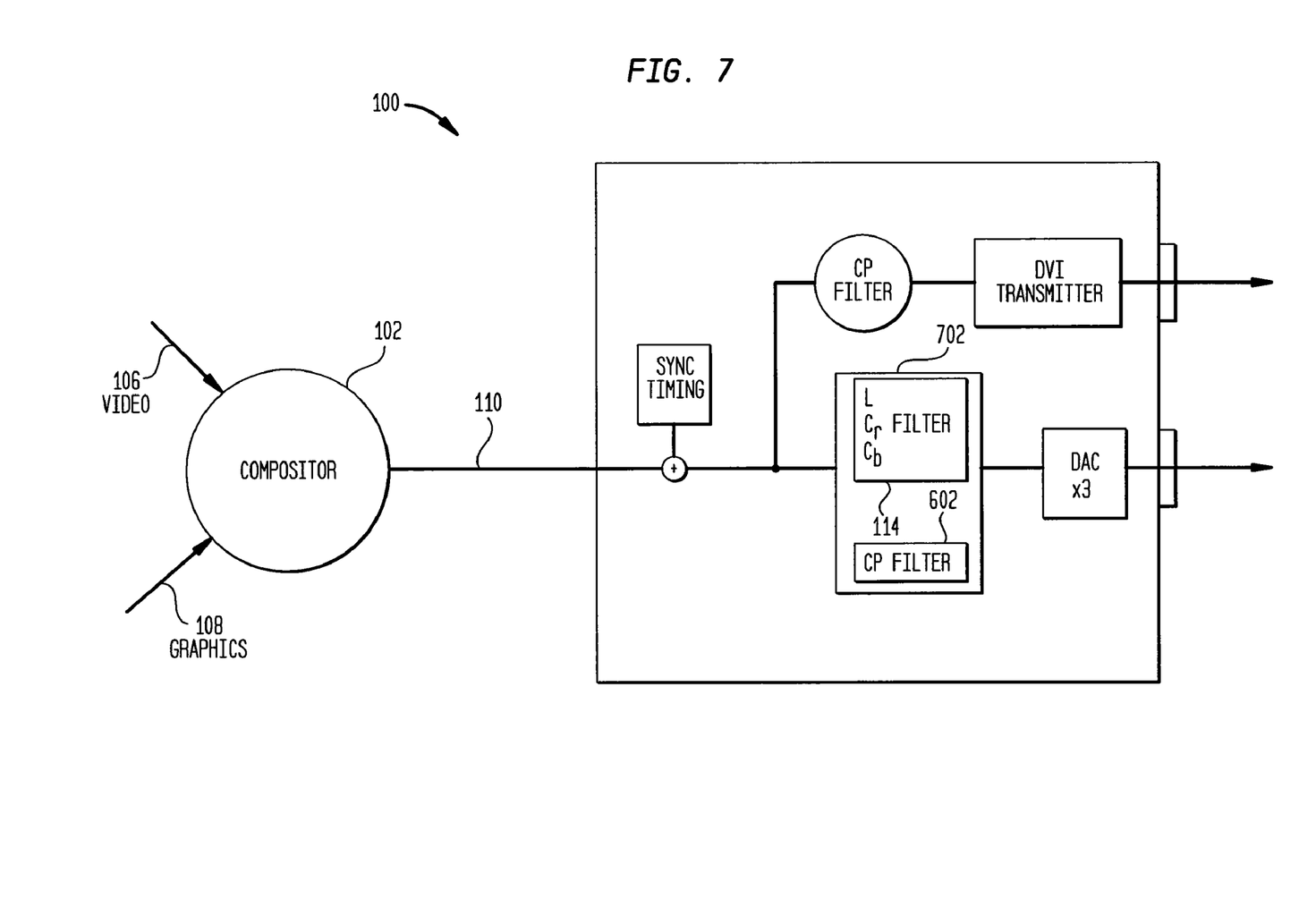
FIG. 7 is another block diagram of an embodiment of the present invention, in which a copy-protection filter is combined with other system filters.

FIG. 7 is a block diagram of yet another embodiment of the present invention. In the example of FIG. 7, copy-protection filter 602 is combined with bandpass filter 114. This combination is referred to as combination filter 702. By implementing both functions in combination filter 702, both cost and required hardware space are decreased.

Figure 8:
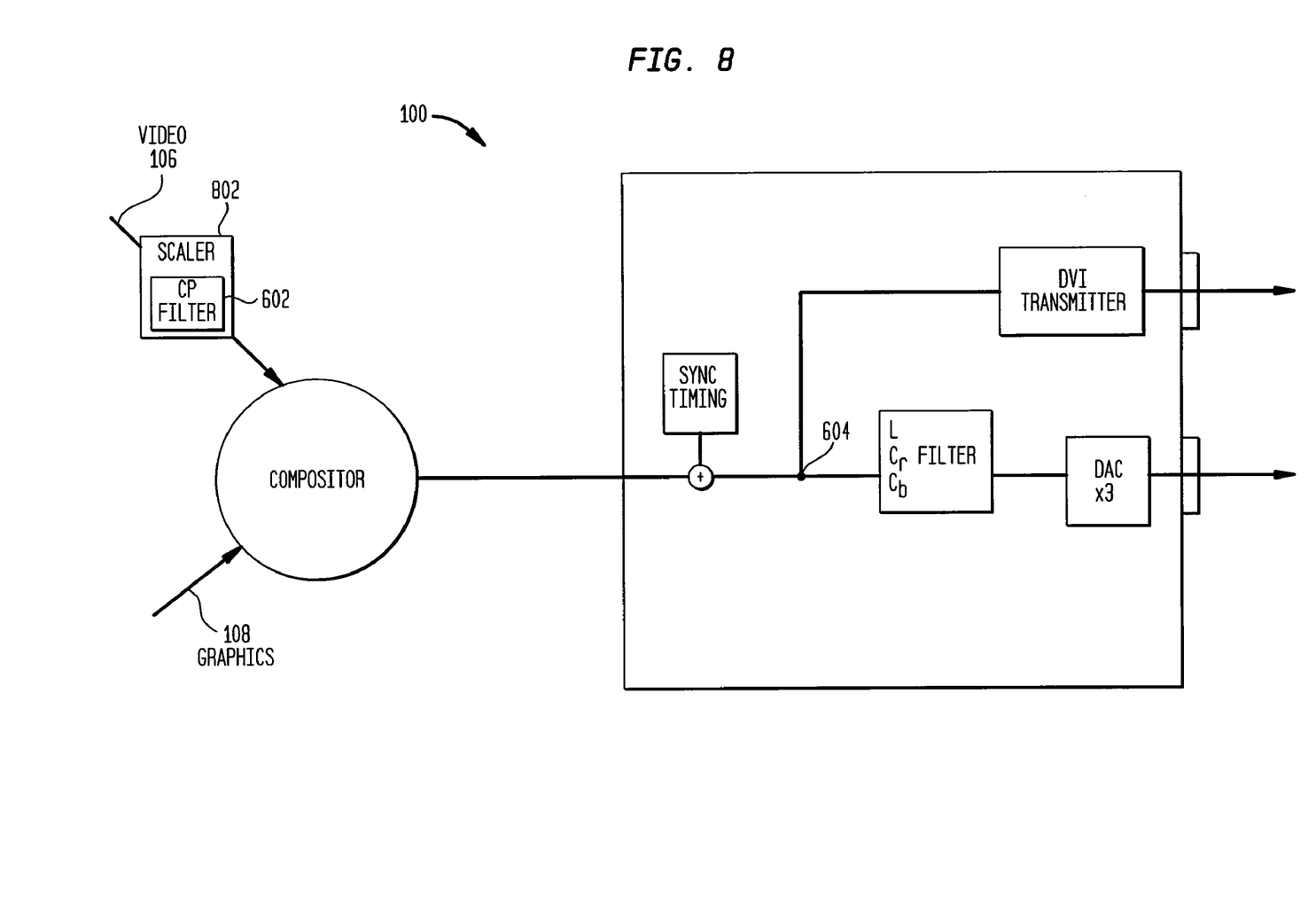
FIG. 8 is another block diagram of an embodiment of the present invention, in which a copy-protection filter is combined with a scaler in the input video signal stream.

FIG. 8 is a block diagram of a further embodiment of the present invention. In the example of FIG. 8, system 100 includes a scaler 802 for scaling a video source into a standard video signal. In this embodiment, copy-protection filter 602 is implemented within scaler 802. This allows for input video signal 106 to be filtered without affecting input graphics signal 108. Since copy-protection filter 602 is implemented before connection 604, both the digital and analog outputs are constrained.

Figure 9:
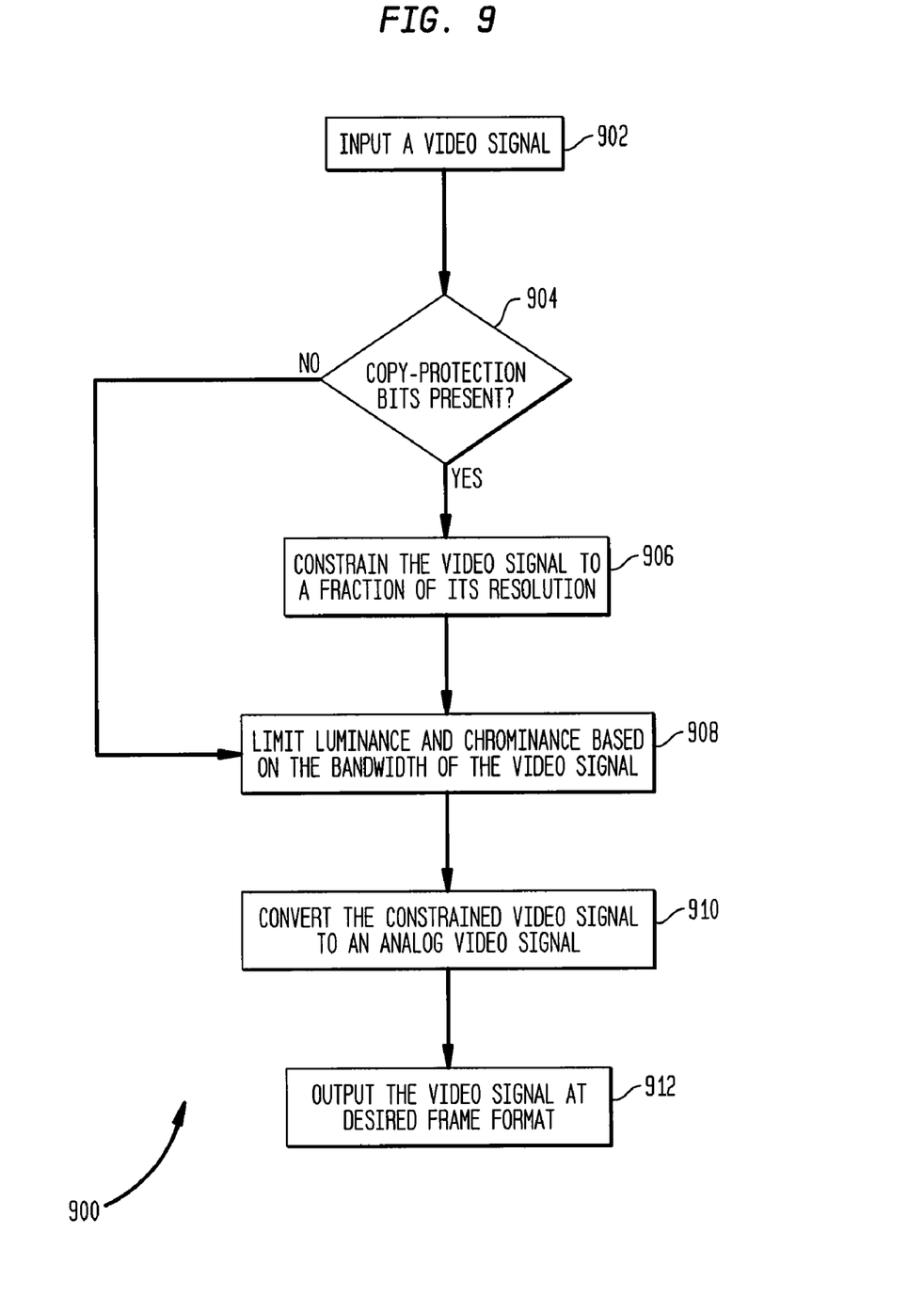
FIG. 9 is a flowchart of an example method of constraining a resolution of a digital video signal.

FIG. 9 is a flowchart of a method 900 for implementing the present invention. Method 900 begins with step 902, in which a video signal is input into, for example, copy-protection filter 602. Method 900 then proceeds to step 904.

In step 904, a decision is made as to whether copy-protection bits are present in the video signal. If copy-protection bits are present, method 900 proceeds to step 906. If copy-protection bits are not present, method 900 advances to step 908.

In step 906, the video signal is constrained to a fraction of its initial resolution. Step 906 may be performed, for example, by the method discussed above with respect to FIG.

2. As discussed above with respect to FIG. 3, the fraction of resolution required depends on the frame format of the video signal.

In step 908, the luminance and chrominance of the signal are limited by, for example, bandpass filter 114. Method 900 proceeds to step 910.

In step 910, the video signal is converted to an analog video signal in, for example, DAC 116. The analog video signal is then output in step 912.

Figure 10:
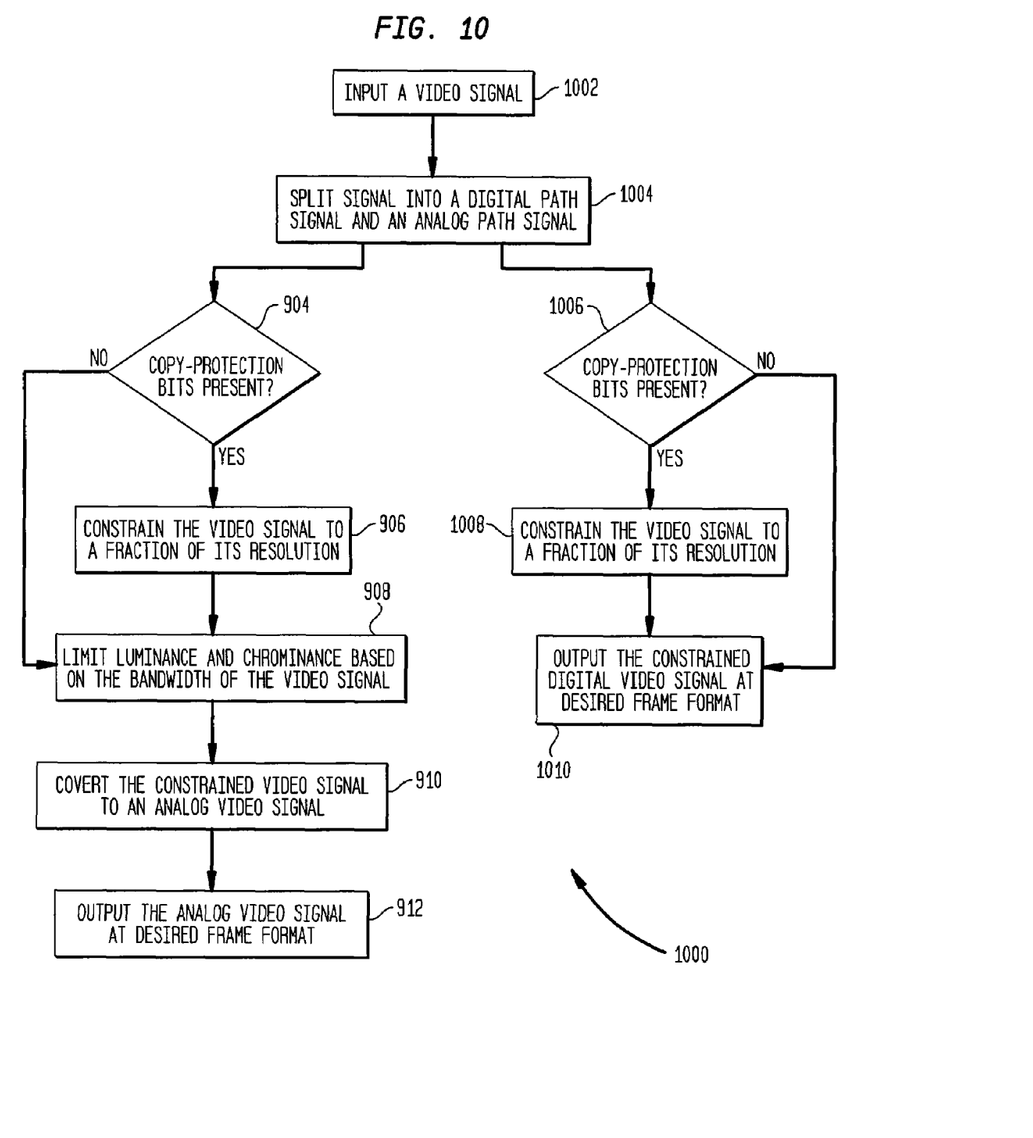
FIG. 10 is a flowchart of another example method of constraining a resolution of a digital video signal.

Other steps may be added to method 900 in accordance with the present invention. For example, FIG. 10 is a flowchart of alternate method 1000. Method 1000 begins with step 1002, in which a video signal is input into, for example, system 100 as illustrated in FIG. 6. Method 1000 then proceeds to step 1004.

In step 1004, the video signal is split into a digital path signal and an analog path signal. The analog path signal follows the same steps as discussed with respect to FIG. 9, namely, steps 904-912. The digital path signal follows steps 1004-1010.

In step 1004, a decision is made as to whether copy-protection bits are present in the digital video signal. If copy-protection bits are present, method 1000 proceeds to step 1008. If copy-protection bits are not present, method 100 advances to step 1010.

In step 1008, the digital video signal is constrained to a fraction of its resolution. The constraining may be performed, for example, by the method discussed above with respect to FIG. 2.

In step 1010, the constrained digital video signal is output. It will be apparent to one of skill in the art that if no copy-protection filter is present in the digital path, or if it is otherwise desired that the digital video signal remain unfiltered, steps 1006 and 1008 may be eliminated.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A device for constraining a video signal, comprising:
a compositor configured to mix a video data stream and a graphics data stream to produce the video signal; and
a video encoder coupled to the compositor,
wherein the video encoder comprises at least one copy-protection filter configured to constrain, based on the presence of input copy-protection bits, the resolution of the video signal to comply with an output frame format, and
wherein the at least one copy-protection filter includes a low pass cutoff frequency based on the output frame format.

2. The device of claim 1, wherein said at least one copy-protection filter constrains the video signal to a resolution of approximately 520,000 pixels per frame.

3. The device of claim 1, wherein said video encoder further comprises:
a sync timing circuit configured to apply horizontal sync and vertical sync to the video signal;
a bandpass filter configured to limit luminance and chrominance of the video signal; and
at least one digital-to-analog converter (DAC) configured to output an analog video signal;
wherein the sync timing circuit, a first one of the at least one copy-protection filter, the bandpass filter, and the DAC are coupled in succession along a first data path.

4. The device of claim 3, wherein said video encoder further comprises three 10-bit DACs.

5. The device of claim 3, wherein said video encoder further comprises:
a second data path coupled to said first data path; and
a digital visual interface (DVI) transmitter in the second data path, wherein said DVI transmitter is configured to output a digital video signal.

6. The device of claim 5, wherein said second data path is coupled to said first data path before the first copy-protection filter on said first data path.

7. The device of claim 6, wherein said at least one copy-protection filter comprises:
a second copy-protection filter located before the DVI transmitter on said second data path.

8. The device of claim 7, wherein said first copy-protection filter and said second copy-protection filter operate independently of one another.

9. The device of claim 3, wherein said at least one copy-protection filter comprises a horizontal low-pass filter.

10. The device of claim 9, wherein said horizontal filter comprises an 11-tap low-pass filter.

11. The device of claim 3, wherein said at least one copy-protection filter comprises a vertical low-pass filter.

12. The device of claim 11, wherein said vertical filter comprises a 4-tap low-pass filter.

13. The device of claim 3, wherein said at least one copy-protection filter comprises a combination horizontal and vertical low-pass filter.

14. The device of claim 3, wherein said bandpass filter limits luminance and chrominance of the video signal when input copy-protection bits are present.

15. The device of claim 3, wherein said bandpass filter and said copy-protection filter are combined into a single filter configured to constrain both resolution and bandwidth of the video signal.

16. A device for constraining a video signal, comprising:
a scaler, for scaling a video data stream;
a compositor configured to mix the video data stream and a graphics data stream to produce the video signal; and
a video encoder coupled to the compositor,
wherein the scaler includes at least one copy-protection filter configured to constrain, based on the presence of input copy-protection bits, the resolution of the video signal to comply with an output frame format, and
wherein the at least one copy-protection filter includes a low pass cutoff frequency based on the output frame format.

17. A method of constraining a video signal, comprising:
(a) searching for input copy-protection bits;
(b) filtering, by a video encoder, pixels of the video signal, when input copy-protection bits are present, to decrease the resolution of the video signal to comply with an output frame format;
(c) passing the video signal through a low pass filter with a cutoff frequency based on the output frame format; and
(d) outputting the decreased-resolution video signal.

18. A method of constraining a video signal having an initial resolution, comprising:
(a) inputting the video signal;

(b) constraining, by a video encoder, the video signal to a fraction of the initial resolution when input copy-protection bits are present to comply with an output frame format, wherein said fraction is based on an initial frame format and the output frame format, and wherein the constraining includes passing the video signal through a low pass filter with a cutoff frequency based on the output frame format; and (c) outputting the constrained video signal.

19. The method of claim 18, wherein said fraction is ¼ when the initial frame format is 1920 scan lines by 1080 pixels per line.

20. The method of claim 18, wherein said fraction is ½ when the initial frame format is 1280 scan lines by 720 pixels per scan line.

21. The method of claim 18, further comprising before said outputting step:

(d) limiting the luminance and chrominance of the video signal based on a bandwidth of the video signal; and (e) converting the limited video signal to an analog video signal.

22. The method of claim 21, further comprising before said constraining step:

splitting the video signal into a first video signal and a second video signal; and transmitting the second video signal in a digital visual interface format to a digital output.

23. The method of claim 22, further comprising before said transmitting step:

constraining the second video signal to a fraction of the resolution, wherein said fraction is based on a desired output frame format, when input copy-protection bits are present.

24. A method of filtering a raster video signal, comprising:

constraining a video data stream when input copy-protection bits are present to comply with an output frame format, wherein the constraining includes passing the video signal though a low pass filter with a cutoff frequency based on the output frame format;

mixing the constrained video data stream and a graphics data stream to produce a constrained composite video signal; and encoding, by a video encoder, the constrained composite video signal.

25. A method of constraining a video signal having an initial resolution, said method comprising:

(a) inputting the video signal;

(b) inserting sync timing signals into timing portions of the video signal;

(c) constraining, by a video encoder, data portions of the video signal when input copy-protection bits are present to a fraction of the initial resolution to comply with an output frame format, wherein the constraining includes passing the video signal through a low pass filter with a cutoff frequency based on the output frame format; and (d) outputting an output video signal, wherein the output video signal includes both constrained data portions and unconstrained timing portions.

* * * * *